Nov. 25, 1941.                P. WILDER                2,264,062
                              OIL SEAL
                        Filed April 28, 1939
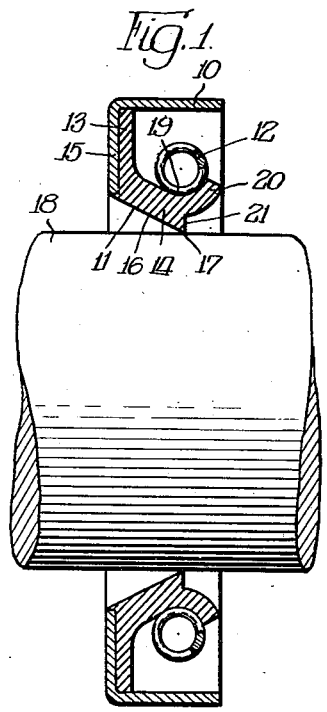
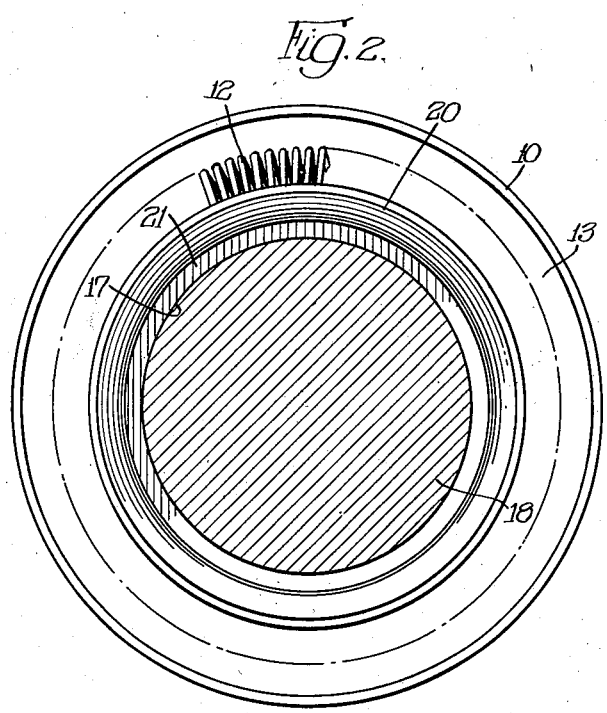
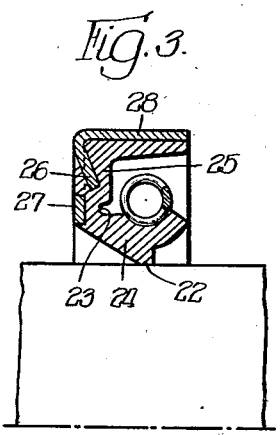
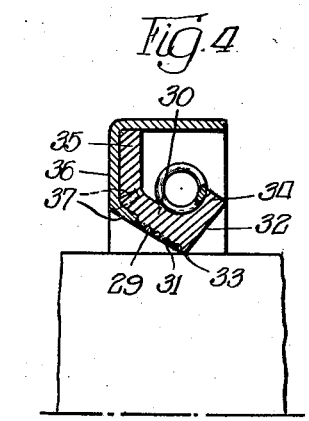
INVENTOR.
Phelps Wilder,
BY Cromwell, Greist + Warden.
ATTORNEYS.

Patented Nov. 25, 1941

2,264,062

UNITED STATES PATENT OFFICE 2,264,062

OIL SEAL

Phelps Wilder, Chicago, Ill., assignor to Chicago Rawhide Manufacturing Company, Chicago, Ill., a corporation of Illinois Application April 28, 1939, Serial No. 270,493

3 Claims. (Cl. 288—3)

This invention has to do with oil seals of the type in which the packing is provided with an interiorly tapered sealing portion which is pressed against the shaft or other member to be sealed by an endless coil spring.

The principal object of the invention is to provide an improved seal of the type described in which the spring is held in a groove in the packing and the grooved portion of the packing is undercut to substantially the median plane of the spring to locate the sealing lip of the packing in the plane of greatest pressure.

Other more specific objects and advantages of the invention will be apparent to those skilled in the art upon a full understanding of the improved sealing unit.

Several different embodiments of the invention are presented herein for the purpose of exemplification, but it will of course be appreciated that the invention is susceptible of incorporation in still other structurally modified forms coming equally within the scope of the appended claims.

In the accompanying drawing:

Fig. 1 is a diametrical section through an oil seal constructed in accordance with the invention, showing the seal in position on the shaft;

Fig. 2 is an end view of the seal; and

Figs. 3 and 4 are radial sections through two modified seal structures.

The seal shown in Figs. 1 and 2 of the drawing consists of a centrally apertured sheet metal cup 10, a molded composition packing ring 11 and an endless coil spring 12. The packing ring 11 is characterized by a radially extending flange 13 and an axially extending sealing portion 14. The flange 13 is bonded or otherwise secured in any suitable manner to the bottom 15 of the cup. The sealing portion 14 is provided about its inner periphery with a tapering surface 16 which terminates in a sharp sealing lip 17 for engagement with the shaft 18 or other member to be sealed, and is provided about its outer periphery with an annular groove 19. The groove 19 is located with its center in substantially the same plane as the sealing lip 17, whereby to cause the spring to exert its greatest pressure against the packing ring at the location of the lip. The spring 12 is applied under tension to the groove 19 and is held in place by a shoulder 20 which forms one side of the groove. From the sealing lip 17 the packing ring preferably extends radially straight out a short distance, presenting an abrupt end face 21 close to the shaft.

In the modification shown in Fig. 3 the sealing lip 22 of the packing ring is widened somewhat, the packing ring is cut back at 23 to increase the flexibility of the sealing portion 24 as a whole, the radially extending flange 25 of the packing ring is molded about inturned tongues 26 struck from the bottom 27 of the cup, and the packing ring is extended axially at the outer periphery of the flange 25 in bonded engagement with the rim 28 of the cup.

In the modification shown in Fig. 4 the tapering surface 29 of the axially extending portion 30 of the sealing ring is covered with a friction-reducing band 31 of flexible fabric material, the end face 32 of the packing ring is uniformly tapered from the sealing lip 33 out to the spring-retaining shoulder 34, and the radially extending flange 35 of the packing ring is additionally secured to the bottom 36 of the cup by small tongues 37 which extend into the packing from the bottom of the cup, first in one direction and then in another.

I claim:

1. In an oil seal, an annular packing having a solid sealing portion of interiorly tapered form for engagement at its small diameter end with a cylindrical surface on a shaft or other member to be sealed, said packing being provided with a spring-retaining shoulder on its outer surface adjacent the small diameter end of the taper, and an endless coil spring encircling the sealing portion of the packing in engagement with the shoulder for pressing the sealing portion against the cylindrical surface on the shaft or other member to be sealed, the sealing portion of the packing at the small diameter end of the taper being undercut back to approximately the median plane of the spring to locate the sealing lip in the plane of greatest pressure and provide a non-sealing portion in substantially the plane of said shoulder.

2. In an oil seal, an annular packing having a solid sealing portion of interiorly tapered form for engagement at its small diameter end with a cylindrical surface on a shaft or other member to be sealed, said packing being provided with a spring-retaining groove in its outer surface adjacent the small diameter end of the taper, and an endless coil spring seated in the groove for pressing the sealing portion of the packing against the cylindrical surface on the shaft or other member to be sealed, the sealing portion of the packing at the small diameter end of the taper being undercut back to approximately the median plane of the spring to locate the sealing lip in the plane of greatest pressure and provide a non-sealing portion beyond said sealing lip.

3. In an oil seal, a centrally apertured sheet metal cup, an annular molded composition packing molded within the cup in firmly adherent relation to the bottom of the same and provided with a sealing portion of interiorly tapered form, said sealing portion being connected to the remaining portion of the packing by a relatively thin flexible portion and being provided with a spring-retaining shoulder on its outer surface adjacent the small diameter end of the taper, and an endless coil spring encircling the sealing portion of the packing in engagement with the shoulder for pressing the sealing portion against the shaft or other member to be sealed, the sealing portion of the packing at the small diameter end of the taper being undercut back to approximately the median plane of the spring to locate the sealing lip in the plane of greatest pressure.

PHELPS WILDER.